United States Patent
Kang et al.

(10) Patent No.: US 10,771,138 B2
(45) Date of Patent: *Sep. 8, 2020

(54) UPLINK MULTI-ANTENNA TRANSMISSION METHOD IN WIRELESS COMMUNICATION SYSTEM AND APPARATUS THEREFOR

(71) Applicant: LG Electronics Inc., Seoul (KR)

(72) Inventors: Jiwon Kang, Seoul (KR); Hanbyul Seo, Seoul (KR); Kijun Kim, Seoul (KR); Hyungtae Kim, Seoul (KR); Youngtae Kim, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/065,704

(22) PCT Filed: Jan. 3, 2017

(86) PCT No.: PCT/KR2017/000048
§ 371 (c)(1),
(2) Date: Oct. 30, 2018

(87) PCT Pub. No.: WO2018/016700
PCT Pub. Date: Jan. 25, 2018

(65) Prior Publication Data
US 2019/0181925 A1    Jun. 13, 2019

Related U.S. Application Data

(60) Provisional application No. 62/370,244, filed on Aug. 3, 2016, provisional application No. 62/365,396, filed on Jul. 22, 2016.

(51) Int. Cl.
*H04B 7/06* (2006.01)
*H04B 7/0404* (2017.01)
(Continued)

(52) U.S. Cl.
CPC ......... *H04B 7/0617* (2013.01); *H04B 7/0404* (2013.01); *H04B 7/0417* (2013.01);
(Continued)

(58) Field of Classification Search
CPC .. H04B 7/0417; H04B 7/0617; H04B 7/0608; H04B 7/0486; H04B 7/0456;
(Continued)

(56) References Cited

U.S. PATENT DOCUMENTS

| | | |
|---|---|---|
| 2014/0112168 A1 | 4/2014 | Chen et al. |
| 2014/0362941 A1* | 12/2014 | Gomadam ........... H04B 7/0456 375/267 |

(Continued)

FOREIGN PATENT DOCUMENTS

| | | |
|---|---|---|
| KR | 20100092863 | 8/2010 |
| KR | 20120004533 | 1/2012 |

(Continued)

OTHER PUBLICATIONS

International Search Report and Written Opinion in International Application No. PCT/KR2017/00048, dated Apr. 24, 2017, 11 pages.

(Continued)

*Primary Examiner* — Kabir A Timory
(74) *Attorney, Agent, or Firm* — Fish & Richardson P.C.

(57) ABSTRACT

Disclosed in the present application is a method for transmitting, by a terminal, an uplink signal to a base station through a plurality of antenna ports in a wireless communication system. Specifically, the method comprises the steps of: transmitting, to the base station, uplink reference signals corresponding to the plurality of antenna ports and antenna port grouping information: receiving, from the base station, information on an uplink precoder, which is determined on the basis of the uplink reference signals and the (Continued)

antenna port group information; precoding the uplink signal using the information on the uplink precoder; and transmitting the precoded uplink signal to the base station, wherein the antenna port grouping information comprises information on antenna port groups comprising the plurality of antenna ports and information of the signal distortion level between the antenna port groups.

9 Claims, 10 Drawing Sheets

(51) Int. Cl.
  *H04B 7/0456* (2017.01)
  *H04L 5/00* (2006.01)
  *H04W 72/04* (2009.01)
  *H04B 7/0417* (2017.01)
  *H04W 72/08* (2009.01)

(52) U.S. Cl.
  CPC ......... *H04B 7/0456* (2013.01); *H04B 7/0486* (2013.01); *H04B 7/0608* (2013.01); *H04L 5/0048* (2013.01); *H04W 72/0406* (2013.01); *H04W 72/082* (2013.01); *H04B 7/0634* (2013.01)

(58) Field of Classification Search
  CPC ... H04B 7/0404; H04B 7/0634; H04L 5/0048; H04W 72/0406; H04W 72/082
  See application file for complete search history.

(56) References Cited

U.S. PATENT DOCUMENTS

2015/0181566 A1* 6/2015 Stopler ............ H04W 72/0413
                                                         370/329
2015/0381246 A1   12/2015 Huang et al.

FOREIGN PATENT DOCUMENTS

| KR | 2012099005 | 9/2012 |
|---|---|---|
| KR | 10-1253204 | 4/2013 |
| KR | 101332762 | 11/2013 |
| KR | 2014003589 | 1/2014 |
| KR | 20140089312 | 7/2014 |
| KR | 101598523 | 2/2016 |
| KR | 20160058716 | 5/2016 |
| WO | WO2016114696 | 7/2016 |

OTHER PUBLICATIONS

Panasonic, "Support of precoded SRS for LTE-Advanced," R1-100379, 3GPP TSG RAN WG1 Meeting #59bis, Valencia, Spain, dated Jan. 18-22, 2010, 5 pages, XP050418042.

Extended European Search Report in European Application No. 17831174.2, dated Oct. 11, 2019, 9 pages.

* cited by examiner (A) CONTROL-PLANE PROTOCOL STACK (B) USER-PLANE PROTOCOL STACK

UPLINK MULTI-ANTENNA TRANSMISSION METHOD IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2017/000048, filed on Jan. 3, 2017, which claims the benefit of U.S. Provisional Application No. 62/370,244, filed on Aug. 3, 2016, and U.S. Provisional Application No. 62/365,396, filed on Jul. 22, 2016. The disclosures of the prior applications are incorporated by reference in their entirety.

TECHNICAL FIELD

The present invention relates to a wireless communication system, and more particularly, to a method for uplink multi-antenna transmission in a wireless communication system and apparatus therefor.

BACKGROUND ART

As an example of a wireless communication system to which the present invention is applicable, a 3rd Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARM)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE OF THE INVENTION

Technical Task

Based on the above discussion, the present invention proposes a method for uplink multi-antenna transmission in a wireless communication system and apparatus therefor.

Technical Solution

In an aspect of the present invention, provided herein is a method for transmitting an uplink signal via a plurality of antenna ports to a base station (BS) by a user equipment (UE) in a wireless communication system. The method may include: transmitting, to the BS, uplink reference signals corresponding to the plurality of antenna ports and antenna port grouping information; receiving, from the BS, information on an uplink precoder, which is determined based on the uplink reference signals and the antenna port grouping information; precoding the uplink signal using the information on the uplink precoder; and transmitting the precoded uplink signal to the BS. In this case, the antenna port grouping information may include information on antenna port groups composed of the plurality of antenna ports and information on signal distortion level between the antenna port groups.

In another aspect of the present invention, provided herein is a user equipment (UE) in a wireless communication system, including: a wireless communication module; and a processor configured to transmit, to a base station (BS), uplink reference signals corresponding to a plurality of antenna ports and antenna port grouping information, receive, from the BS, information on an uplink precoder, which is determined based on the uplink reference signals and the antenna port grouping information, precode an uplink signal using the information on the uplink precoder, and transmit the precoded uplink signal to the BS. In this case, the antenna port grouping information may include information on antenna port groups composed of the plurality of antenna ports and information on signal distortion level between the antenna port groups.

Preferably, the information on the uplink precoder may include partial precoders for the antenna port groups. More preferably, if the signal distortion level is less than a predetermined value, the information on the uplink precoder may include phase information for concatenation of the partial precoders.

Additionally, partial precoders may be applied to a corresponding antenna port group, and a concatenating precoder may be applied to the antenna port groups to compensate for signal distortion between the antenna port groups.

However, if the signal distortion level is less than a predetermined value, the information on the uplink precoder may include information on the concatenating precoder. In addition, if the signal distortion level is equal to or more than a predetermined value, the concatenating precoder may be determined based on phase information for concatenation of the partial precoders included in the information on the uplink precoder. Specifically, a plurality of candidate concatenating precoders may be determined based on the phase information for the concatenation of the partial precoders, and the plurality of candidate concatenating precoders may be cyclically applied in order of time resource indices or frequency resource indices.

Advantageous Effects

According to embodiments of the present invention, a UE can efficiently transmit uplink signals via multiple antennas.

The effects of the present invention are not limited to the above-described effects and other effects which are not described herein will become apparent to those skilled in the art from the following description.

BEST MODE FOR INVENTION

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

Figure 1:
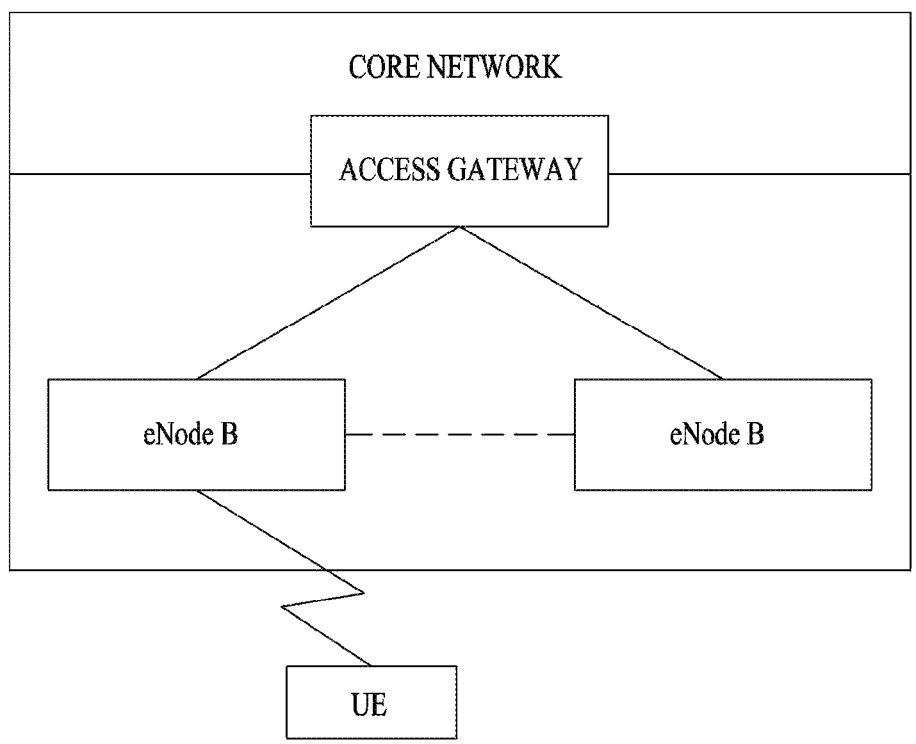
FIG. 1 is a diagram schematically illustrating a network structure of an E-UMTS as an exemplary radio communication system.
Figure 2:
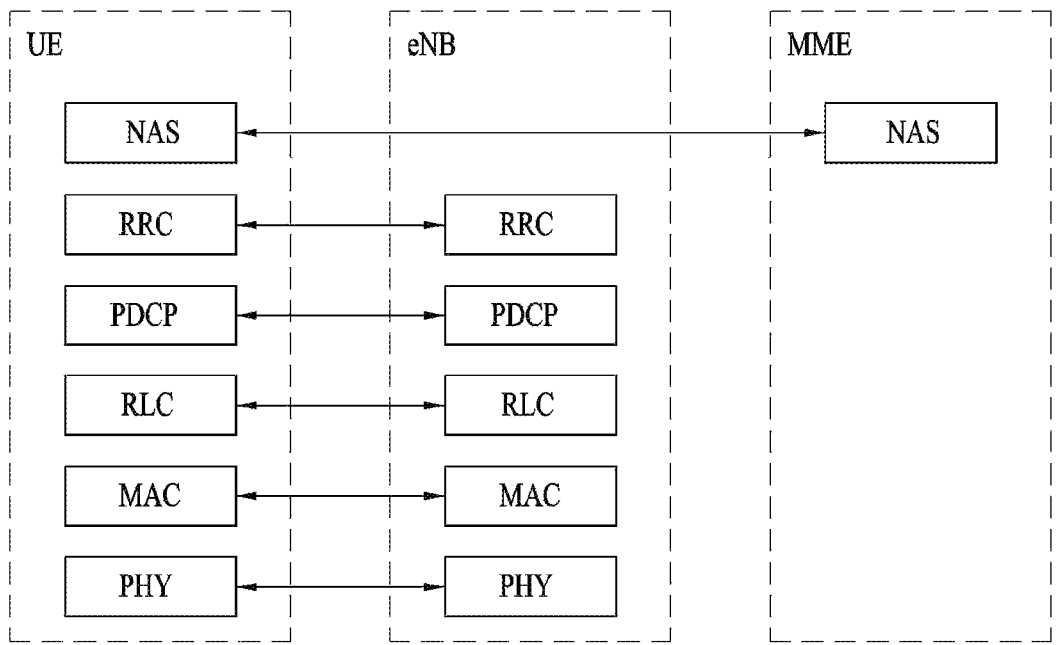
FIG. 2 is a diagram illustrating structures of a control plane and a user plane of a radio interface protocol between a UE and an E-UTRAN based on the 3GPP radio access network specification.
Figure 2:
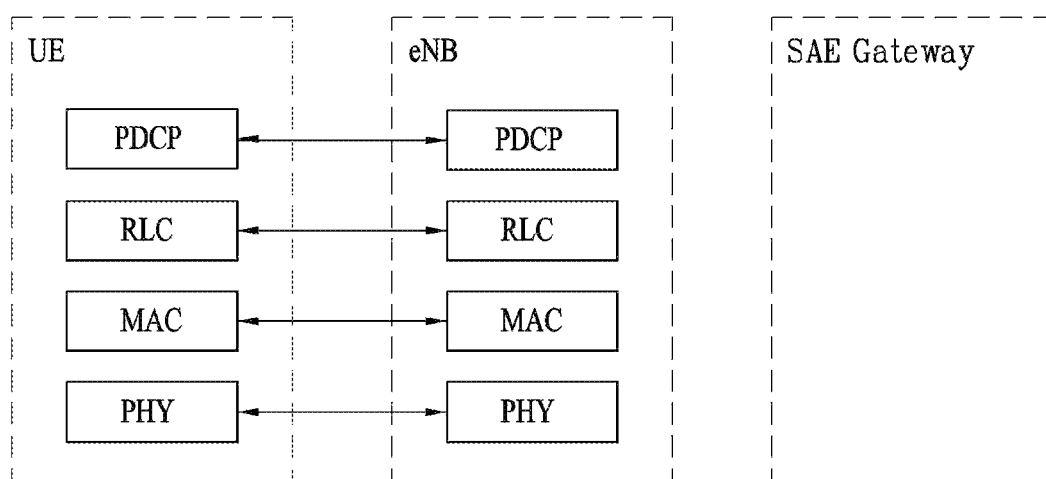

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
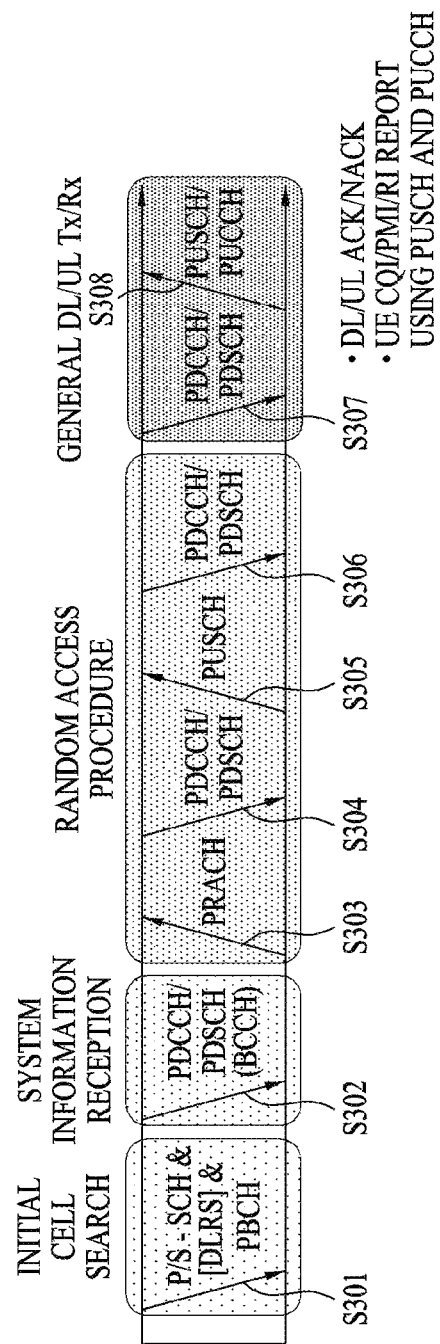
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
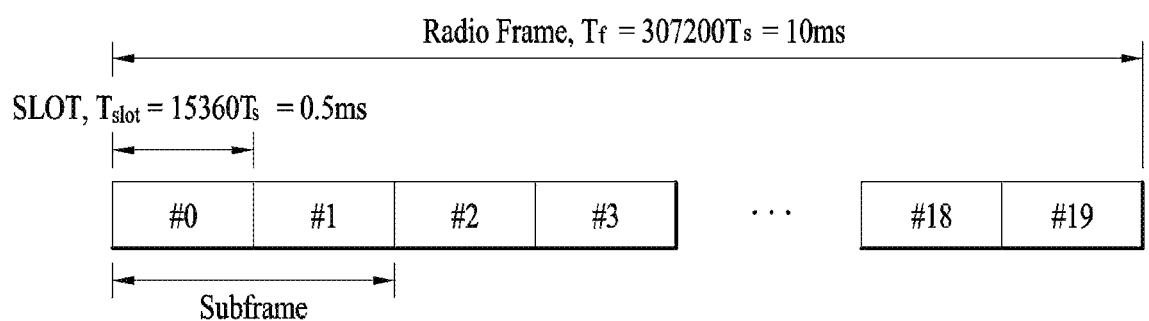
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10$^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
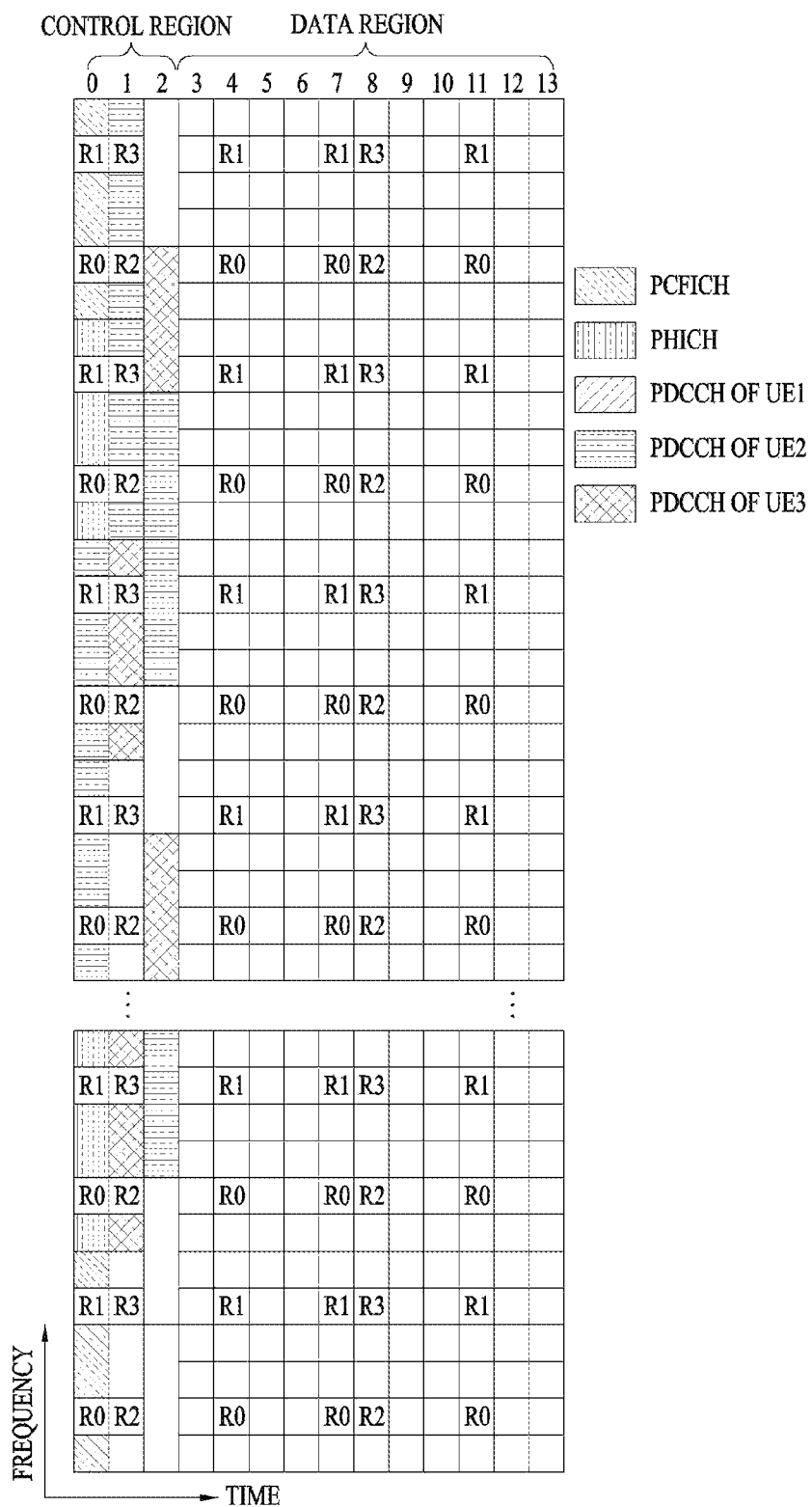
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g.

frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
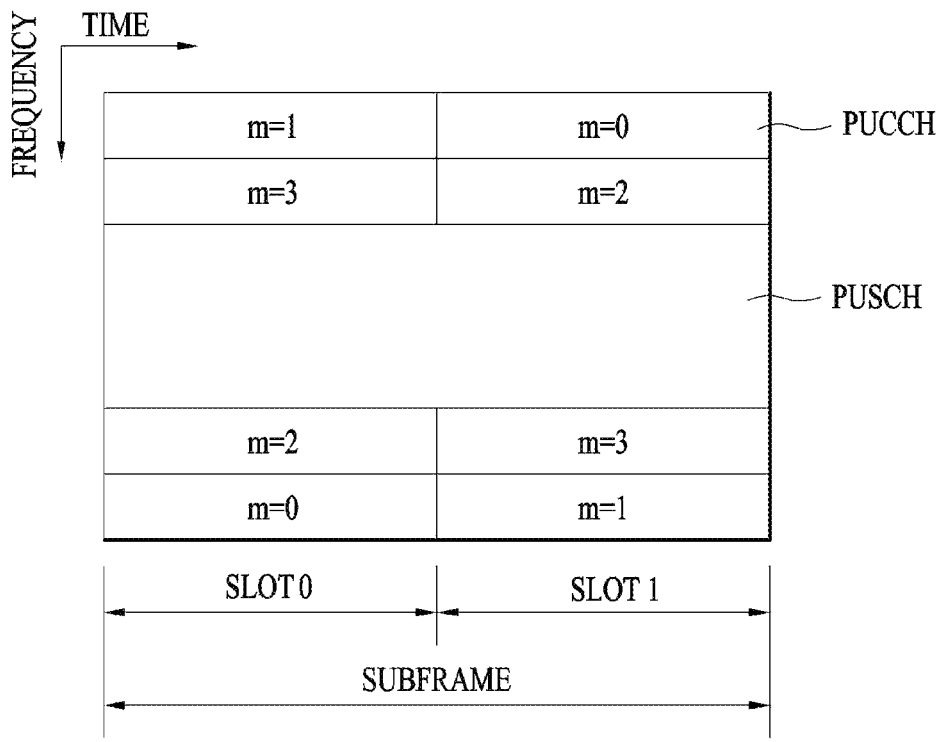
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
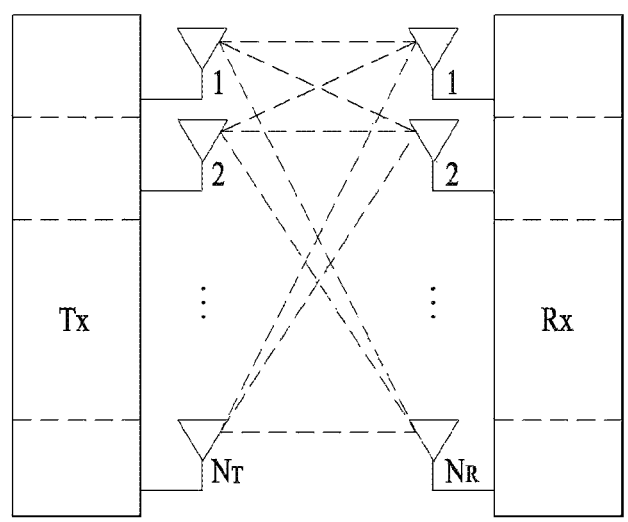
FIG. 7 is a diagram illustrating a configuration of a general MIMO communication system.

FIG. 7 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. Here, $R_i$ is the smaller of $N_T$ and $N_R$.

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Meanwhile, in the LTE-S system that is the standard of the next generation mobile communication system, it is expected to support CoMP (coordinated multi point) transmission scheme, which is not supported by the existing standard, for data transmission rate improvement. Here, the CoMP transmission scheme means a transmission scheme for two or more base stations or cells to communicate with a user equipment (UE) cooperatively to improve performance of communication between a UE in a radio shadow area and a base station (a cell or sector).

CoMP transmission schemes may be classified into COMP joint processing (CoMP-JP) of cooperative MIMO characterized by data sharing and CoMP-coordinated scheduling/beamforming (CoMP-CS/CB).

In DL CoMP-JP, a UE may instantaneously receive data simultaneously from base stations that perform CoMP transmission and may combine the received signals, thereby increasing reception performance (joint transmission (JT)). In addition, one of the base stations participating in CoMP transmission may transmit data to the UE at a specific time point (dynamic point selection (DPS)). In contrast, in CoMP-CS/CB, a UE may receive data instantaneously from one base station, that is, a serving base station by beamforming.

In UL CoMP-JP, base stations may receive a PUSCH signal simultaneously from a UE (joint reception (JR)). In contrast, in CoMP-CS/CB, only one base station receives a PUSCH. Herein, cooperative cells (or base stations) may make a decision as to whether to use CoMP-CS/CB.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI. Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

Hereinafter, a reference signal (RS) will be described.

In general, for channel measurement, a reference signal previously known to both transmitting and receiving ends is transmitted along with data from the transmitting end to the receiving end. The reference signal provides information on a modulation scheme as well as information for the channel measurement so that demodulation can be performed. The reference signal is classified into a dedicated RS (DRS) for a BS and a specific UE, i.e., UE-specific reference signal and a cell-specific reference signal (CRS) for all UEs in a cell, i.e., common RS. In addition, the CRS includes a reference signal used by a UE to measure CQI/PMI/RI and report the same to a BS, which is referred to as a channel state information reference signal (CSI-RS).

In the following, QCL (Quasi Co-Location) between antenna ports is explained.

QCL between antenna ports indicates that all or a part of large-scale properties of a signal (or a radio channel corresponding to a corresponding antenna port) received by a user equipment from a single antenna port may be identical to large-scale properties of a signal (or a radio channel corresponding to a corresponding antenna port) received from a different single antenna port. In this case, the larger-scale properties may include Doppler spread related to frequency offset, Doppler shift, average delay related to timing offset, delay spread and the like. Moreover, the larger-scale properties may include average gain as well.

According to the aforementioned definition, a user equipment cannot assume that the large-scale properties are identical to each other between antenna ports not in the QCL, i.e., NQCL (Non Quasi co-located) antenna ports. In this case, the user equipment should independently perform a tracking procedure to obtain frequency offset, timing offset and the like according to an antenna port.

On the contrary, the user equipment can perform following operations between antenna ports in QCL.

1) The user equipment can identically apply power-delay profile for a radio channel corresponding to a specific antenna port, delay spread, Doppler spectrum and Doppler spread estimation result to a Wiener filter parameter, which is used for estimating a channel for a radio channel corresponding to a different antenna port, and the like.

2) After obtaining time synchronization and frequency synchronization for the specific antenna port, the user equipment can apply identical synchronization to a different antenna port as well.

3) The user equipment can calculate an average value of RSRP (reference signal received power) measurement values of each of the antenna ports in QCL to obtain average gain.

For instance, having received DM-RS based downlink data channel scheduling information (e.g., DCI format 2C) via PDCCH (or E-PDCCH), the user equipment performs channel estimation for PDSCH via a DM-RS sequence indicated by the scheduling information and may be then able to perform data demodulation.

In this case, if a DM-RS antenna port used for demodulating a downlink data channel and a CRS antenna port of a serving cell are in QCL, when the user equipment performs a channel estimation via the DM-RS antenna port, the user equipment can enhance reception capability of the DM-RS based downlink data channel in a manner of applying large-scale properties of a radio channel estimated from a CRS antenna port of the user equipment as it is.

Similarly, if a DM-RS antenna port used for demodulating a downlink data channel and a CSI-RS antenna port of a serving cell are in QCL, when the user equipment perform a channel estimation via the DM-RS antenna port, the user equipment can enhance reception capability of the DM-RS based downlink data channel in a manner of applying large-scale properties of a radio channel estimated from a CSI-RS antenna port of the serving cell as it is.

In the LTE system, it has been defined that when a downlink signal is transmitted in transmission mode 10, which is the CoMP mode, the BS configures either QCL type A or QCL type B for the UE through a higher layer signal.

In QCL type A, antenna ports for the CRS, DM-RS, and CSI-RS are quasi co-located (QCLed) with respect to large-scale properties except average gain. This means that physical channels and signals are transmitted on the same node (point). On the other hand, in QCL type B, to enable CoMP transmission such as DPS, JT, etc., up to four QCL modes are configured for each UE through a higher layer message, and which QCL mode will be used for DL signal reception is dynamically indicated through downlink control information (DCI).

Hereinafter, DPS transmission when QCL type B is configured will be described in detail.

First, it is assumed that node #1 having N1 antenna ports transmits CSI-RS resource #1 and node #2 having N2 antenna ports transmits CSI-RS resource #2. In this case, CSI-RS resource #1 is included in QCL mode parameter set #1 and CSI-RS resource #2 is included in QCL mode parameter set #2. Moreover, a BS configures QCL mode parameter sets #1 and #2 for a UE located within the common coverage of nodes #1 and #2 through a higher layer signal.

Thereafter, the BS may perform DPS by configuring QCL mode parameter set #1 for the UE using DCI when transmitting data (i.e., PDSCH) to the UE through node #1 and configuring QCL mode parameter set #2 for the UE when transmitting data to the UE through node #2. When QCL mode parameter set #1 is configured, the UE may assume that CSI-RS resource #1 is QCLed with a DM-RS, and when QCL mode parameter set #2 is configured, the UE may assume that CSI-RS resource #2 is QCLed with the DM-RS.

The current cellular system has evolved from 4G to 5G. The 5G communication systems have considered not only enhanced mobile broadband (eMBB) based on smartphones but also various IoT (Internet of Things) application services such as health care, disaster and safety management, vehicle communication, manufacturing plant control, robot control, etc., and terminal types have also been diversified. In addition, the 5G communication systems have considered use of ultra-high frequency bands including millimeter wave bands up to the maximum 100 GHz. Due to implementation of various types of terminals and use of the ultra-high frequency bands, tens or hundreds of antennas may be installed in a terminal unlike the 4G system. For example, the vehicle may be implemented as one terminal, and thus multiple antennas may be installed in one or a plurality of vehicles in a distributed manner.

Figure 8:
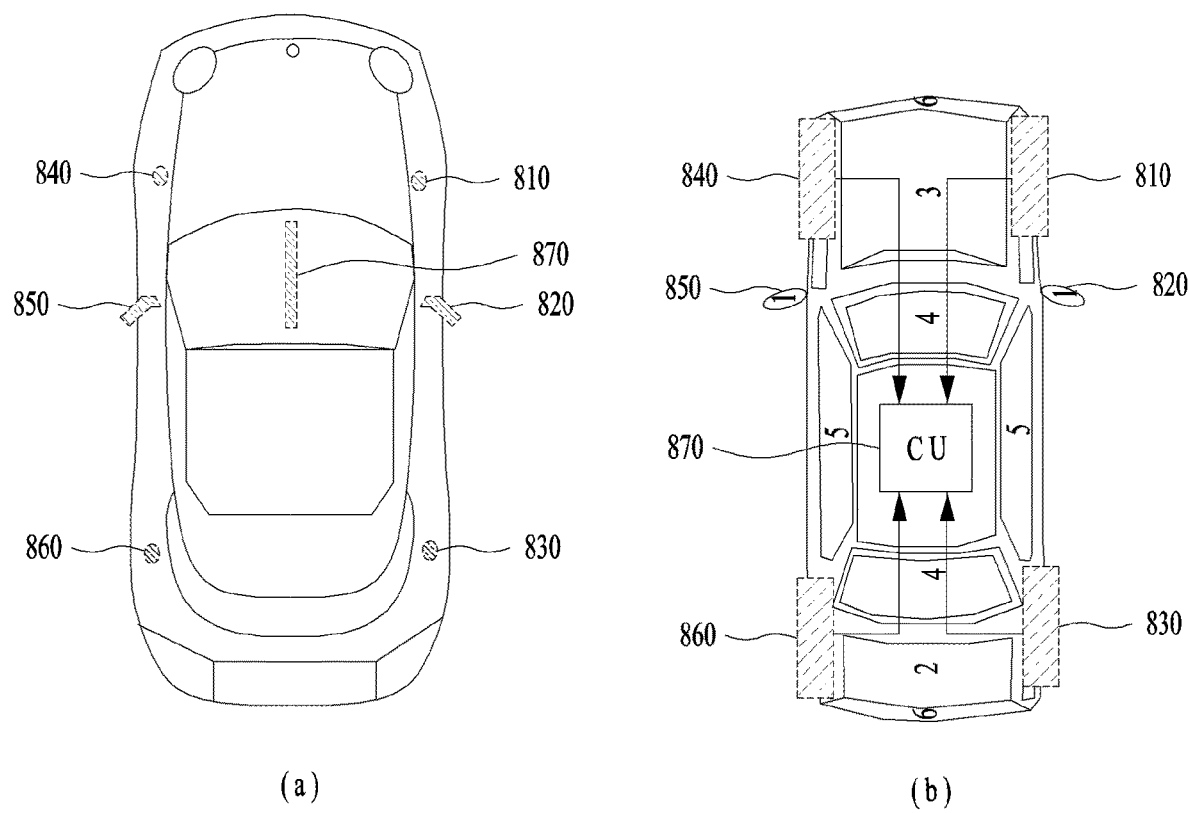
FIG. 8 illustrates a vehicle including multiple antenna arrays.

FIG. 8 illustrates a vehicle including multiple antenna arrays.

Referring to FIG. 8, a plurality of antennas 810, 820, 830, 840, 850, and 860 may be installed in the vehicle. In this case, the locations and number of the plurality of antennas 810, 820, 830, 840, 850, and 860 may vary per vehicle according to vehicle design. In this case, the following configuration can be applied even when the locations and number of the plurality of antennas 810, 820, 830, 840, 850, and 860 vary, and the present invention is not limited to the following embodiment. In other words, the invention can be applied to various types of antennas with a variety of radiation patterns, which can be obtained by modifying the plurality of antennas 810, 820, 830, 840, 850, and 860.

In this case, signals for distributed antenna units (DUs) or remote units (RUs), which are distributed in the vehicle, can be controlled by a central control unit (CU) 870. That is, the CU 870 of the vehicle may not only receive a signal from the BS with the maximum reception diversity by controlling signals for the RUs 810, 820, 830, 840, 850, and 860 installed in the vehicle but also prevent wireless connection between the vehicle and BS from being disconnected while the vehicle moves at high speed. That is, the vehicle may be considered as a terminal with multiple antennas or a relay terminal for relaying signals. Further, the vehicle may provide high quality services to a plurality of terminals in the vehicle by controlling and relaying the signal received through the CU 870.

Figure 9:
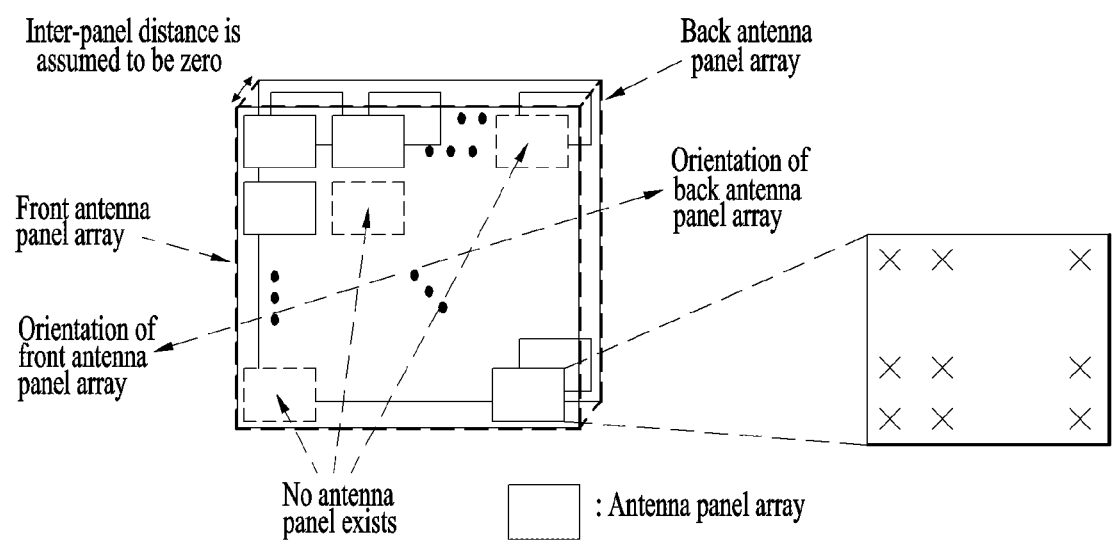
FIG. 9 illustrates an example where multiple antenna panel arrays are installed in a terminal.

As another example, in high frequency bands, multiple antenna panel arrays may be installed in a terminal. FIG. 9 illustrates an example where multiple antenna panel arrays are installed in a terminal. In particular, multiple antenna elements are uniformly distributed in an antenna panel array, but the antenna direction or interval between antenna panel arrays may not be uniform.

When a plurality of antenna panel arrays with different directivity (or coverage) are installed in a terminal as described above, it may be difficult to apply the codebook, which is designed on the assumption of standard precoding such as uniform linear/rectangular arrays as in the conventional uplink MIMO scheme.

In addition, if a distance between each of the plurality of antenna panel arrays and a baseband processor (for example, the CU in FIG. 8) varies, a fixed phase difference may occur due to different delay. It may cause a situation that time synchronization between signals transmitted from different antenna units varies in the OFDM system. Due to this situation, the BS may observe that the phases of signals transmitted from a specific UE antenna group are linearly distorted in proportion to subcarriers.

Further, when a different oscillator is used for a signal transmitted from each antenna panel array, the signal may be transmitted at slightly changed frequency due to an oscillator error, and this may cause a frequency synchronization error at the BS. Thus, the BS may observe decrease in the magnitude of the signals transmitted from the specific UE antenna group and noise increase due to phase distortion and inter-carrier interference (ICI).

The above-described problem related to magnitude/phase distortion between UE's transmission antenna groups may have different levels of seriousness depending on UE implementation. For example, such a cabling issue may be solved at the implementation stage by designing the UE to perform a separate procedure for compensating for delay per antenna group. The oscillator issue may also be solved at the implementation stage by using a single oscillator or introducing a separate frequency compensation process. However, such a compensation process may require an additional processor or RF circuit, and thus it may increase the implementation complexity and cost of the UE. Since the 5G terminal includes a high-end terminal with a high-cost processor for obtaining high quality data and a low-cost IoT terminal as described above, it is desirable to support various levels of distortion.

Therefore, the present invention proposes a method for uplink multi-antenna transmission adaptive to inter-APG (antenna port group) distortion vulnerability level, which varies per terminal and relevant signaling procedure. For convenience of description, distortion vulnerability level is abbreviated as DVL.

First Embodiment

The first embodiment of the present invention proposes that a UE reports information on an uplink reference signal to a BS. Particularly, when a non-precoded reference signal is used, the UE may report reference signal port grouping information on uplink reference signal antenna ports.

In addition, when a precoded reference signal is used, the UE may report the number of uplink antenna panel arrays (or reference signal port groups), reference signal port grouping information, or the maximum number of ports per reference signal port group. Additionally, the UE may report DVL information between reference signal port groups to the BS. Of course, when the BS provides the corresponding UE with the uplink reference signal configuration, the reference signal port grouping information may be indicated.

In the following description, an uplink reference signal is assumed to be a sounding reference signal for convenience of description. When a total of M SRSs are grouped into a predetermined number of port groups, SRS port grouping information indicates the number of SRS ports included in each port group either implicitly or explicitly. The SRS port grouping information may correspond to antenna panel array configuration information or distributed antenna unit information of the UE.

For example, the SRS port grouping information may indicate information on the number of SRS ports included in each group, $M_i$ (i=1, N), where N indicates the number of port groups. More specifically, in the case of M=5, $M_1$=3, $M_2$=2, and N=2, the information indicates that SRS ports {0,1,2} are included in the first group and SRS ports {3,4} are included in the second group.

The SRS port grouping information may be used to configure, determine, and indicate an uplink MIMO precoder. This will be described in detail with reference to the second embodiment. In addition, the SRS port grouping information may be used to estimate/correct uplink synchronization. For example, since each SRS port group may have different frequency/time synchronization characteristics, the BS may perform uplink synchronization correction with reference to only a specific SRS port group.

Moreover, the SRS port grouping information may be used to estimate uplink channels. If the BS estimates channels with respect to all SRS ports in such an environment, the BS may measure increase in the jitter due to oscillator characteristics different from delay spread, which increases due to cable delay at the antenna port group level. Thus, depending on usage and channel parameters to be estimated, the measurement may need to be performed at the SRS port group level.

Further, since each SRS port group may have different large scale fading such as shadowing, it may be used to measure a quality value such as RSRP (reference signals received power), RSRQ (reference signal received quality), CQI, etc., per port group.

Lastly, the BS may measure a phase/magnitude distortion value per antenna panel array/group or SRS port group and then inform the UE of the measured value so that the UE may perform pre-compensation and then report the information. For example, the BS may measure a phase shift value, which is linear to frequency, that occurs due to different cable delay per SRS port group and then inform the UE of the phase shift value per SRS port group.

Thus, after receiving the SRS port grouping information, the BS may use it for at least one of uplink MIMO precoding configuration information, uplink synchronization estimation/correction, uplink channel estimation, and distortion compensation per SRS port group. If the SRS port grouping information is used for compensating the distortion per SRS port group, the BS may signal a magnitude/phase correction value per SRS port group to the UE.

As an example of the DVL information between SRS port groups, the following three stages: HIGH, MIDIUM, LOW stages may be considered. Upon receiving this information, if DVL=HIGH, the BS may interpret the corresponding UE has severe phase distortion, for example, the UE is a low-end UE. On the contrary, if DVL=LOW, the BS may interpret the corresponding UE has almost no phase distortion. Alternatively, depending on whether meaningful magnitude/phase distortion occurs, two stages: ON and OFF may be considered.

When the two stages of DVL information is considered, it may be information indicating whether the BS can assume the same attenuation characteristics such as shadowing, the same frequency characteristics such as Doppler, and/or the same time characteristics such as delay with respect to some or all of channel estimation parameters when performing uplink channel estimation using a plurality of antenna ports, similar to the QCL information between antenna ports for downlink reference signals in the LTE system. In other words, it may correspond to QCL information between uplink SRS port groups.

According to the first embodiment of the present invention, since the DVL and/or SRS port grouping information is information on UE characteristics and it is not dynamically changed, it is desirable to transmit the information through a higher layer message such as an RRC layer message.

Second Embodiment

The second embodiment of the present invention proposes that a BS configures uplink MIMO precoder configuration information, which will be transmitted to a UE, as described in the following sections 1) to 3).

1) Partial precoder configuration information: In the case of a non-precoded SRS, PMI information to be used per SRS port group may be included, and in the case of a precoded SRS, information on an SRS port index (indices) may be included.

2) Magnitude/phase coordination information between partial precoders (concatenating precoder information): In the case of concatenating precoder information, the presence or absence and size of the information may be differentiated according to the UE's DVL or BS's indication. Alternatively, precoder range information such as information on whether a concatenating precoder cycles and precoder set information may be included. Further, transmit diversity or open-loop precoding among candidate concatenation precoding schemes such as LD-CDD (large delay CDD) of the LTE system may be included.

3) Information on the number of simultaneously transmitted layers or rank information: This may be commonly indicated for all SRS ports.

Particularly, according to the second embodiment of the present invention, the BS basically indicates information on a precoder to be used per SRS port group but differentiates phase correction information between groups according to DVL. When an SRS port is transmitted from each independent transmission RF chain as in the LTE system, that is, in the case of non-precoded SRS port transmission, MIMO precoder information to be used per SRS port group may contain an uplink PMI and RI (rank indicator), which will be used by the UE.

When beamforming is applied to an SRS port, that is, when one SRS port is transmitted from a plurality of transmission RF chains through beamforming to a specific precoder, the BS may indicate UE precoder information as SRS port index (indices) information. In the case of the beamformed SRS, a method for transmitting independent SRS ports by applying beamforming to each UE antenna group in the first embodiment may be considered. According to the third embodiment, a PMI or port selection information may be indicated for each SRS port group such that a partial precoder can be configured for each UE antenna groups with different radio channel and hardware characteristics. In addition, in the case of RI information, since a common RI should be applied to all SRS port groups, only a single value can be signaled. Moreover, in the case of the beamformed SRS, the RI information may be dropped because it could be implicitly signaled by the number of ports per SRS group.

The UE may obtain partial precoder information from the above-described information. In other words, the UE may obtain information on the partial precoding matrix $W'_i$ with a size of M$i$×r (where i=1, N and r=transmission rank). To determine the precoding matrix W with a size of M×r for all antennas ($M=\Sigma_{i=1}^{N} M_i$), the UE should perform a process for concatenating individual partial precoding matrices. In addition, to this end, the UE requires information for correcting magnitude and phase differences between the partial precoding matrices.

Assuming that the magnitude and phase correction values for the $j^{th}$ layer of the $i^{th}$ partial precoder are $a_{i,j}$ and $\theta_{i,j}$, respectively, the corrected partial precoding matrix can be calculated according to Equation 1.

$$W_i = [a_{i,1}e^{j\theta_{i,1}}w_{i,1} \ldots a_{i,RI}e^{j\theta_{i,RI}}w_{i,RI}], \quad \text{[Equation 1]}$$

where $NW$ indicated precoder $W'_i$ $$= [w_{i,1} \ldots w_{i,RI}]$$

Based on Equation 1, the final precoding matrix can be calculated as shown in Equation 2.

$$W = \begin{bmatrix} W_1 \\ \vdots \\ W_N \end{bmatrix} \quad \text{[Equation 2]}$$

For the same reason as that concatenating PMI (CPMI) information is required when a plurality of BSs participate in cooperative transmission, the magnitude/phase adjustment between partial precoders needs to be performed. The magnitude correction information may be indicated by the BS when each antenna group has different pathloss or shadowing characteristics. If the characteristics are similar, the information may be dropped. The magnitude/phase correction information may be differentiated according to DVL.

For example, in the case of a UE with good DVL, precise magnitude/phase correction information may be transmitted so that the UE may accurately concatenate partial precoding matrices. In the case of a UE with poor DVL, when a plurality of BSs participate in cooperative transmission, non-precise (coarse) correction information may be transmitted, or the corresponding information may be dropped. Hereinafter, examples of differentiating downlink control information according to DVL will be described. In particular, DCI case 1 corresponds to non-precoded SRS transmission, and DCI case 2 corresponds to beamformed SRS transmission.

(1) When the UE reports DVL=HIGH,
DCI case 1: uplink PMI per each SRS port group+RI
DCI case 2: SRS port index (indices) per SRS port group (+RI)

In particular, in DCI case 2, the RI may be implicitly determined by the number of SRS ports, and in this case, it may not be provided through the corresponding control information.

(2) When the UE reports DVL=MID,
DCI case 1: uplink PMI per SRS port group+RI+U-bit resolution phase information ($\theta_{i,j}'$, i=1, ..., N−1, j=1, ..., RI) for concatenation of SRS port groups
DCI case 2: uplink PMI per SRS port group+RI+U-bit resolution phase information ($\theta_{i,j}'$, i=1, ..., N−1, j=1, ..., RI) for concatenation of SRS port groups Similarly, in DCI case 2, the RI may be implicitly determined by the number of SRS ports, and in this case, it may not be provided through the corresponding control information.

(3) When the UE reports DVL=LOW,
DCI case 1: uplink PMI per SRS port group+RI+V-bit resolution phase information ($\theta_{i,j}'$, i=1, ..., N−1, j=1, ..., RI) for concatenation of SRS port groups In this case, the value of V is equal to or more than that of U, and this information may be replaced with uplink PMIs for all SRS ports.

DCI case 2: SRS port index (indices) per SRS port group (+RI)+V-bit resolution phase information ($\theta_{i,j}'$, i=1, ..., N−1, j=1, ..., RI) for concatenation of SRS port groups Similarly, the value of V is equal to or more than that of U, and this information may be replaced with SRS port indices for all SRS port groups In addition, in DCI case 2, the RI may be implicitly determined by the number of SRS ports, and in this case, it may not be provided through the corresponding control information.

When the above-described method is applied, a UE with high DVL may have a problem that the phase correction information is absent or insufficient. However, such a problem may be caused when the corresponding information could be unnecessary because the phase distortion may occur due to the hardware characteristics. Such a UE may perform transmission by generating a plurality of concatenating precoders and using them alternatively on a promised time/frequency resource basis. This will be described in detail with reference to the third embodiment. When such a method (hereinafter, this method will be referred to as concatenating precoder cycling), the BS may include information required to apply the corresponding scheme in signaling. For example, information on the presence or absence of cycling, information on a range of cycling phases/magnitudes, and information on a concatenating precoder set may be included.

Third Embodiment

The third embodiment of the present invention proposes a semi-open loop uplink MIMO precoding scheme. To this end, when a UE has DVL equal to or less than a specific level or is instructed by the BS to apply partial or concatenating precoders, the UE configures the MIMO precoder to be applied to uplink transmission as follows.

Partial precoder: the MIMO precoder to be applied for uplink transmission is determined based on downlink control information indicated by the BS.

Concatenating precoder: (a) the UE may select a random concatenating precoder every predetermined time/frequency resources or use a concatenating precoder predetermined through higher layer signal or in the specification, or (b) the UE may generate a plurality of concatenating precoder sets based on concatenating precoder information, which is generated from downlink control information indicated by the BS and then alternatively use the precoder sets every predetermined time/frequency resources.

Hereinafter, examples of the third embodiment when three stages of DVL is applied will be described.

(A) When the UE reports DVL=HIGH, method (a) is applied.

A different concatenating precoder is applied every time/frequency resource.

That is, the concatenating precoder $\theta i,j(k)$ for the $k^{th}$ time/frequency resource is defined as $Di,j(k)$. Thereafter, for $Di,j(k)$, a random value may be selected by the UE, or the value predetermined through higher layer signal or in the specification may be used.

For example, the value of (360*a natural number) may be divided by the number of resources according to the number of allocated frequency resources, and then it may be consistently increased depending on the resource index. Alternatively, the value of (360*a natural number) may be divided by the number of resources according to the size of allocated frequency resources, and then $Di,j(k)$ may be determined according to a specific interleaving pattern.

(B) When the UE reports DVL=MID, method (b) is applied.

A different concatenating precoder is applied every time/frequency resource.

That is, the concatenating precoder $\theta i,j(k)$ for the $k^{th}$ time/frequency resource is defined as $Ei,j(k)$+value indicated by DCI. Particularly, although for $Ei,j(k)$, a random value may be selected by the UE or the value predetermined through higher layer signal or in the specification may be used, the corresponding value may be selected within a specific angle range.

For example, X degrees (where X<<180) may be divided by the number of resources according to the number of allocated frequency resources, and then it may be consistently increased depending on the resource index. Alternatively, X degrees (where X<<180) may be divided by the number of resources according to the size of allocated frequency resources, and then $Di,j(k)$ may be determined according to a specific interleaving pattern.

(C) When the UE reports DVL=LOW,
A common concatenating precoder is applied to all time/frequency resources.

That is, the concatenating precoder $\theta i,j$ for all time/frequency resources may be fixed to a value indicated by DCI.

When the proposed method is applied, the number of layers to be simultaneously transmitted is determined with reference to a global precoder obtained by combining partial precoders. In addition, not only a method for transmitting demodulation RS (DM-RS) ports as many as the number of layers but a method for mapping different partial precoders to different uplink DM-RS ports may be considered.

In other words, although the UE transmits a DM-RS port(s) using the partial precoder per antenna group indicated by the BS, the UE may apply an open-loop precoding scheme such as a transmit diversity scheme to ports corresponding to data channels such as a PUSCH, PUCCH, etc. This operation is similar to that of the 3GPP LTE system where open-loop precoding is applied using a plurality of CRS ports, but it is different in that beamforming indicated by the BS is applied to each RS port per antenna group. For example, in the case of rank-1 transmission, if a UE has a total of two antenna groups, a total of two DM-RS ports are transmitted, that is, one DM-RS port per antenna group, but the Alamouti based transmit diversity scheme is applied between the two ports. In this case, which scheme will be applied should be promised between the BS and UE because the BS needs to assume the corresponding scheme for data demodulation.

Figure 10:
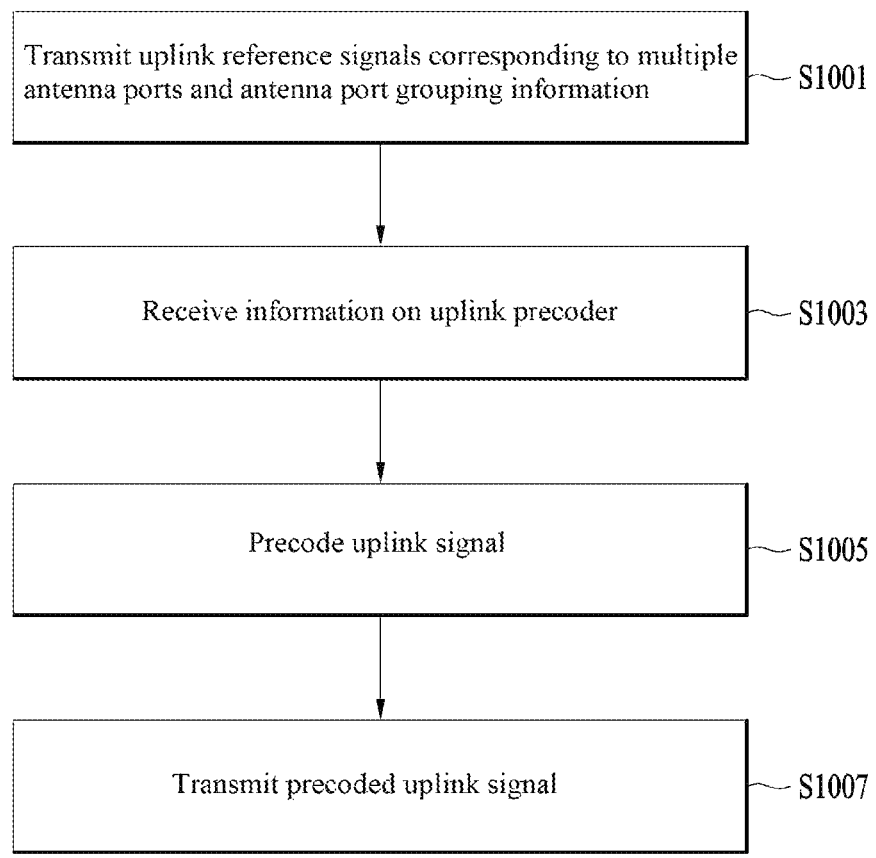
FIG. 10 is a flowchart illustrating that a UE performs uplink MIMO transmission according to the present invention.

FIG. 10 is a flowchart illustrating that a UE performs uplink MIMO transmission according to the present invention.

Referring to FIG. 10, the UE may transmit uplink reference signals corresponding to a plurality of antenna ports and antenna port grouping information to the BS in step 1001. In this case, the antenna port grouping information includes information on antenna port groups composed of the plurality of antenna ports and information on signal distortion level between the antenna port groups.

Next, in step 1003, the UE receives, from the BS, information on an uplink precoder, which is determined based on the uplink reference signals and the antenna port grouping information. In this case, the information on the uplink precoder may include partial precoders for the antenna port groups. Additionally, the signal distortion level is less than a predetermined value, the information on the uplink precoder may include phase information for concatenation of the partial precoders.

Moreover, the UE performs precoding of the uplink signal using the information on the uplink precoder in step 1005 and transmits the precoded uplink signal to the BS in step 1007. In particular, the partial precoders are applied to a corresponding antenna port group, and a concatenating precoder for correcting signal distortion between the antenna port groups is applied to the antenna port groups. In this case, if the signal distortion level is less than the predetermined level, the information on the uplink precoder may include information on the concatenating precoder.

Additionally, if the signal distortion level is equal to or more than the predetermined value, the concatenating precoder may be determined based on the phase information for the concatenation of the partial precoders included in the information on the uplink precoder. For example, a plurality of candidate concatenating precoders are determined based on the phase information for the concatenation of the partial precoders, and then the plurality of candidate concatenating precoders may be cyclically applied in order of time resource indices or frequency resource indices.

Figure 11:
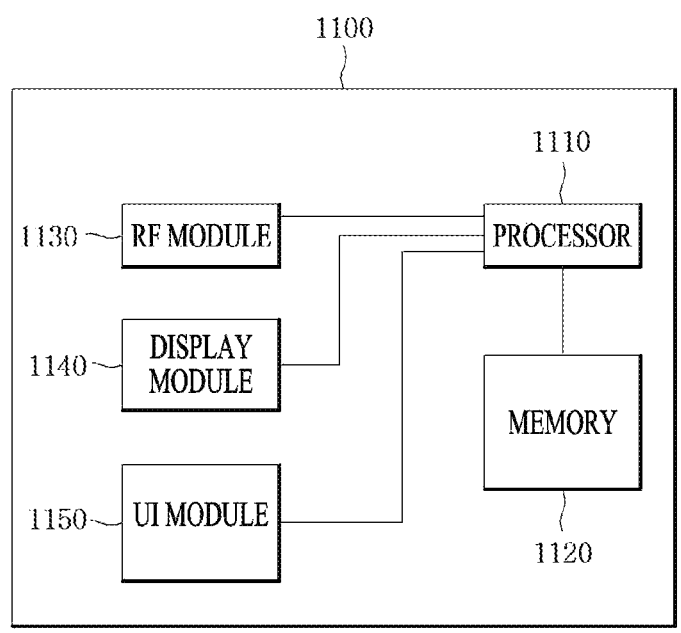
FIG. 11 is a block diagram of a communication apparatus according to an embodiment of the present invention.

FIG. 11 is a block diagram of a communication apparatus according to an embodiment of the present invention.

Referring to FIG. 11, a communication apparatus 1100 includes a processor 1110, a memory 1120, an RF module 1130, a display module 1140, and a User Interface (UI) module 1150.

The communication device 1100 is shown as having the configuration illustrated in FIG. 11, for the convenience of description. Some modules may be added to or omitted from the communication apparatus 1100. In addition, a module of the communication apparatus 1100 may be divided into more modules. The processor 1110 is configured to perform operations according to the embodiments of the present invention described before with reference to the drawings. Specifically, for detailed operations of the processor 1110, the descriptions of FIGS. 1 to 10 may be referred to.

The memory 1120 is connected to the processor 1110 and stores an Operating System (OS), applications, program codes, data, etc. The RF module 1130, which is connected to the processor 1110, upconverts a baseband signal to an RF signal or downconverts an RF signal to a baseband signal. For this purpose, the RF module 1130 performs digital-to-analog conversion, amplification, filtering, and frequency upconversion or performs these processes reversely. The display module 1140 is connected to the processor 1110 and displays various types of information. The display module 1140 may be configured as, not limited to, a known component such as a Liquid Crystal Display (LCD), a Light Emitting Diode (LED) display, and an Organic Light Emitting Diode (OLED) display. The UI module 1150 is connected to the processor 1110 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method for uplink multi-antenna transmission in a wireless communication system and apparatus therefor are described based on the 3GPP LTE system, the method and apparatus can be applied to various wireless communication systems as well as the 3GPP LTE system.

What is claimed is:

1. A method for transmitting an uplink signal to a base station (BS) by a user equipment (UE) in a wireless communication system, the method comprising:
   transmitting, to the BS, sounding reference signals (SRSs);
   receiving, from the BS and based on the transmitted SRSs, downlink control information (DCI) related to transmitting the uplink signal;
   determining, based on the DCI, a precoder and a rank for transmitting the uplink signal; and
   transmitting, to the BS, the uplink signal by using the determined rank and the determined precoder,
   wherein:
      in a first scenario for transmitting the uplink signal: (i) the DCI comprises a rank indicator (RI), and (ii) the UE determines the precoder and the rank based on the DCI which comprises the RI, and
      in a second scenario for transmitting the uplink signal: (i) the UE transmits the SRSs as beamformed SRSs, (ii) the DCI comprises information related to a SRS antenna port, but the DCI does not include the RI, and (iii) the UE determines the precoder and the rank based on the information related to the SRS antenna port.

2. The method of claim 1, wherein:
   in the first scenario for transmitting the uplink signal, (i) the DCI further comprises a precoding matrix indicator (PMI), and (ii) the UE determines the precoder and the rank based on the DCI which comprises the RI and the PMI, and
   in the second scenario for transmitting the uplink signal, the DCI does not include the PMI.

3. The method of claim 1, wherein the uplink signal is transmitted by applying beamforming which is applied to the sounding references signal antenna port.

4. A user equipment (UE) in a wireless communication system, the UE comprising:
   a radio frequency (RF) unit;
   at least one processor; and
   at least one computer memory operably connectable to the at least one processor and storing instructions that, based on being executed by the at least one processor, perform operations comprising:
      transmitting, to a base station (BS), sounding reference signals (SRSs);
      receiving, from the BS and based on the transmitted SRSs, downlink control information (DCI) related to transmitting the uplink signal;
      determining, based on the DCI, a precoder and a rank for transmitting the uplink signal; and
      transmitting, to the BS, the uplink signal by using the determined rank and the determined precoder,
      wherein:
         in a first scenario for transmitting the uplink signal: (i) the DCI comprises a rank indicator (RI), and (ii) the UE determines the precoder and the rank based on the DCI which comprises the RI, and
         in a second scenario for transmitting the uplink signal: (i) the UE transmits the SRSs as beamformed SRSs, (ii) the DCI comprises information related to a SRS antenna port, but the DCI does not include the RI, and (iii) the UE determines the precoder and the rank based on the information related to the SRS antenna port.

5. The UE of claim 4, wherein:
   in the first scenario for transmitting the uplink signal, (i) the DCI further comprises a precoding matrix indicator (PMI), and (ii) the UE determines the precoder and the rank based on the DCI which comprises the RI and the PMI, and
   in the second scenario for transmitting the uplink signal, the DCI does not include the PMI.

6. The UE of claim 4, wherein the uplink signal is transmitted by applying beamforming which is applied to the sounding references signal antenna port.

7. A processing apparatus configured to control a user equipment (UE) to operate in a wireless communication system, the processing apparatus comprising:
   at least one processor; and
   at least one computer memory operably connectable to the at least one processor and storing instructions that, based on being executed by the at least one processor, perform operations comprising:
      transmitting, to a base station (BS), sounding reference signals (SRSs);
      receiving, from the BS and based on the transmitted SRSs, downlink control information (DCI) related to transmitting the uplink signal;
      determining, based on the DCI, a precoder and a rank for transmitting the uplink signal; and
      transmitting, to the BS, the uplink signal by using the determined rank and the determined precoder,
      wherein:
         in a first scenario for transmitting the uplink signal: (i) the DCI comprises a rank indicator (RI), and (ii) the UE determines the precoder and the rank based on the DCI which comprises the RI, and
         in a second scenario for transmitting the uplink signal: (i) the UE transmits the SRSs as beamformed SRSs, (ii) the DCI comprises information related to a SRS antenna port, but the DCI does not include the RI, and (iii) the UE determines the precoder and the rank based on the information related to the SRS antenna port.

8. The processing apparatus of claim 7, wherein:
   in the first scenario for transmitting the uplink signal, (i) the DCI further comprises a precoding matrix indicator (PMI), and (ii) the UE determines the precoder and the rank based on the DCI which comprises the RI and the PMI, and in the second scenario for transmitting the uplink signal, the DCI does not include the PMI.

9. The processing apparatus of claim 7, wherein the uplink signal is transmitted by applying beamforming which is applied to the sounding references signal antenna port.

* * * * *